(12) United States Patent
Chandhoke

(10) Patent No.: US 7,689,727 B2
(45) Date of Patent: *Mar. 30, 2010

(54) SYSTEM AND METHOD FOR AUTOMATICALLY UPDATING THE MEMORY MAP OF A PROGRAMMABLE CONTROLLER TO CUSTOMIZED HARDWARE

(75) Inventor: Sundeep Chandhoke, Austin, TX (US)

(73) Assignee: National Instruments Corporation, Austin, TX (US)

( * ) Notice: Subject to any disclaimer, the term of this patent is extended or adjusted under 35 U.S.C. 154(b) by 200 days.

This patent is subject to a terminal disclaimer.

(21) Appl. No.: 11/427,052

(22) Filed: Jun. 28, 2006

(65) Prior Publication Data

US 2007/0174518 A1     Jul. 26, 2007

Related U.S. Application Data

(63) Continuation-in-part of application No. 11/338,922, filed on Jan. 24, 2006, now Pat. No. 7,379,777.

(51) Int. Cl.
*G06F 3/00* (2006.01)
*G05B 13/02* (2006.01)
(52) U.S. Cl. .................. 710/8; 710/2; 710/15; 710/10; 700/40
(58) Field of Classification Search .............. 710/2, 710/8, 10, 15; 700/40
See application file for complete search history.

(56) References Cited

U.S. PATENT DOCUMENTS 4,566,061 A     1/1986  Ogden et al.

(Continued)

FOREIGN PATENT DOCUMENTS

WO     2004/077182 A1     9/2004

(Continued)

OTHER PUBLICATIONS

"Simatic FM 352-5 High-speed Boolean Processor User Manual"; Edition Apr. 2003; 246 pages; Siemens Energy & Automation Inc.; Alpharetta GA.

(Continued)

*Primary Examiner*—Niketa I Patel
*Assistant Examiner*—Farley J Abad
(74) *Attorney, Agent, or Firm*—Meyertons Hood Kivlin Kowert & Goetzel, P.C.; Jeffrey C. Hood; Joel L. Stevens

(57) ABSTRACT

System and method for automatically updating a memory map coupled to or included in a programmable controller (PrC). A PrC may automatically detect at least one programmable hardware element (PHE) coupled to the PrC. The PHE may provide a customizable interface, i.e., input and output (I/O) interface, between one or more devices and the PrC. The devices may include one or more measurement, data acquisition, signal generation, automation, motion control, and/or analysis device(s), among others. The PHE may perform one or more functions on the data transmitted between the device(s) and the PrC. One or more of the PHEs and/or device(s) may be local or remote to the PrC. The PrC may automatically update the memory map based on a hardware I/O interface of the at least one programmable hardware element, where the memory map facilitates communications between programs executing on the PrC and the programmable hardware element.

26 Claims, 7 Drawing Sheets

U.S. PATENT DOCUMENTS

| | | | | |
|---|---|---|---|---|
| 5,230,061 | A | * | 7/1993 | Welch ........................ 706/46 |
| 5,260,875 | A | * | 11/1993 | Tofte et al. ................... 701/50 |
| 5,392,252 | A | | 2/1995 | Rimpo et al. |
| 5,481,741 | A | | 1/1996 | McKaskle et al. |
| 5,594,917 | A | | 1/1997 | Palermo et al. |
| 5,765,000 | A | | 6/1998 | Mitchell et al. |
| 5,941,305 | A | | 8/1999 | Thrasher et al. |
| 5,963,726 | A | | 10/1999 | Rust et al. |
| 5,978,593 | A | | 11/1999 | Sexton |
| 6,016,563 | A | * | 1/2000 | Fleisher ...................... 714/725 |
| 6,138,174 | A | * | 10/2000 | Keeley ......................... 710/5 |
| 6,526,462 | B1 | | 2/2003 | Elabd |
| 6,629,165 | B1 | | 9/2003 | Seki et al. |
| 6,631,301 | B2 | | 10/2003 | Focke et al. |
| 6,701,284 | B1 | * | 3/2004 | Huntley et al. ............. 702/187 |
| 6,779,048 | B2 | | 8/2004 | Seki et al. |
| 6,853,867 | B1 | | 2/2005 | Klindt et al. |
| 6,973,508 | B2 | * | 12/2005 | Shepard et al. ................ 710/8 |
| 7,003,733 | B2 | | 2/2006 | Duemler |
| 7,058,693 | B1 | | 6/2006 | Baker, Jr. |
| 7,062,335 | B2 | | 6/2006 | Klindt et al. |
| 7,180,732 | B2 | * | 2/2007 | Meehan et al. ............. 361/685 |
| 2002/0133240 | A1 | * | 9/2002 | Nagao et al. .................... 700/9 |
| 2003/0074489 | A1 | | 4/2003 | Steger et al. |
| 2003/0107599 | A1 | * | 6/2003 | Fuller et al. .................. 345/763 |
| 2003/0113693 | A1 | * | 6/2003 | Yunten ....................... 434/118 |
| 2004/0032429 | A1 | * | 2/2004 | Shah et al. .................. 345/771 |

FOREIGN PATENT DOCUMENTS

WO      WO 2004077182 A1 *   9/2004

OTHER PUBLICATIONS

U.S. Appl. No. 11/329,788 titled "Programmatic control of tasks in a programmable logic controller" filed Jan. 10, 2006, whose inventor is Sundeep Chandhoke.

U.S. Appl. No. 11/329,770 titled "Control of tasks in a programmable logic controller" filed Jan. 10, 2006, whose inventor is Sundeep Chandhoke.

"Programmable logic controller"; Retrieved from the Internet: http://en.wikipedia.org/w/index.php?title=Programmable_logic_controller&oldid=103377747; Jan. 26, 2007; 9 pages.

"Field-programmable gate array"; Retrieved from the Internet: http://en.wikipedia.org/w/index.php?title=Field-programmable_gate_array&oldid=103136173; Jan. 25, 2007; 10 pages.

International Search Report and Written Opinion for International application No: PCT/US2007/060761, mailed May 23, 2007.

* cited by examiner a programmable logic controller (PLC) automatically detecting at least one programmable hardware element coupled to the PLC
402 the PLC automatically updating a memory map based on a hardware I/O interface of the programmable hardware element
404

*Figure 4*

SYSTEM AND METHOD FOR AUTOMATICALLY UPDATING THE MEMORY MAP OF A PROGRAMMABLE CONTROLLER TO CUSTOMIZED HARDWARE

CONTINUATION DATA

This application is a continuation in part of U.S. patent application Ser. No. 11/338,922, titled "System and Method for Automatically Updating the Memory Map of a Programmable Logic Controller to Customized Hardware" filed Jan. 24, 2006, now U.S. Pat. No. 7,379,777, whose inventor is Sundeep Chandhoke.

FIELD OF THE INVENTION

The present invention relates to the field of programmable logic controllers, and more particularly to a system and method for automatically updating memory maps in programmable logic controllers.

DESCRIPTION OF THE RELATED ART

In recent years, programmable logic controllers (PLCs), have become central for controlling relays, motion, distributed resources, networking, and automation, among others. PLCs have become so ubiquitous because of their ability to provide a "generic" solution to a variety of control, measurement, and automation problems. Typically, a skilled technician may be able to adaptively program the PLC, via user programs, to provide solutions to new problems as they arise rather than having to design and manufacture a new hardware controller. Additionally, a PLC may include a memory map usable for communicating with various devices coupled to the PLC via an input/output (I/O) interface. However, these memory maps are generally fixed according to manufactured specifications.

Thus, improved systems and methods for memory maps in PLCs are desirable.

SUMMARY OF THE INVENTION

Various embodiments of the present invention include a system and method for updating memory maps in programmable controllers. In particular, the embodiments described herein may apply to programmable controllers which utilize scanning architectures. For example, the programmable controllers may include various types of programmable logic controllers (PLCs), programmable automation controllers (PACs), and/or distributed control systems (DCSs), among others.

A programmable controller (PrC) may automatically detect at least one programmable hardware element (PHE) coupled to the PrC. The detection may be performed by a program or runtime environment running on the PrC, e.g., a controller engine. In some embodiments, the PHE may include at least one field-programmable gate array (FPGA). The PHE may provide a customizable interface between one or more devices coupled to the PHE and the PrC. The devices may be any of various types, such as, for example, measurement device(s), data acquisition device(s), signal generation device(s), automation device(s), motion control device(s), and/or analysis device(s), among others.

In some embodiments, the PHE may provide a customizable interface between the devices coupled to the PHE, and/or between the devices and programs executing on the PrC, e.g., via a memory map of the PrC. As described above, the one or more devices may be coupled to the PHE in various ways, e.g., using various protocols for remote or local communication, via various networks and/or buses. Similarly, the PHE may be coupled to the PrC remotely or locally and may communicate with the PrC via various protocols and buses. In some embodiments, the PrC may be included in a chassis which may include one or more slots, and the blackplane of the chassis may include the PHE coupled to the PrC. In these embodiments, at least one of the one or more devices may include a module insertable into a slot of the chassis. Said another way, a subset or all of the devices may include modules which may be inserted into the chassis and may couple to the PrC via the backplane, in this case, the PHE.

In some embodiments, the PHE may perform one or more functions on the input and/or output of the devices and/or the PrC. For example, the PHE may be operable to receive data from a device coupled to the PHE and perform one or more functions on the data, e.g., a transformation function on a signal, and subsequently provide the modified data to the PrC. Similarly, the PHE may be operable to perform one or more functions on data received from the PrC and provide the modified data from the PrC to the one or more devices. Note that the I/O of the PrC and devices may include digital and analog I/O data points as well as higher-level I/O data, such as sensor and/or actuator data, e.g., set points, encoder positions, etc. Note also that the I/O may include any of various types of data transmitted between the PrC and the devices and is not limited to those listed above.

In some embodiments, the PHE may be customized by a program, e.g., a graphical program, which may specify the functions usable on the I/O of the PrC and the one or more coupled devices. Thus, the PHE may provide a customizable interface between the one or more devices and the PrC, e.g., one or more programs executing on the PrC, e.g., included in one or more tasks executing on the PrC.

As indicated above, in some embodiments, the PrC may be coupled to a plurality of PHEs. Similar to above, each of the PHEs may provide a customizable interface between the PrC and one or more devices coupled to each of the PHEs. As indicated above, at least a subset of the PHEs may be remotely or locally coupled to the PrC, e.g., via various buses and/or networks and via various protocols. Additionally, each of the PHEs may be customized via one or more programs, e.g., graphical program(s) and/or text-based program(s). In some embodiments, the PrC may communicate directly, and/or via one or more intermediate devices, with remote PHEs.

The PrC may automatically update a memory map based on a hardware I/O interface of the at least one programmable hardware element. In other words, the PrC, e.g., the controller engine executing on the PrC, may automatically detect the I/O of the at least one PHE coupled to the PrC and update, e.g., adapt, the memory map either included in or coupled to the PrC in accordance with the I/O of the PHE. Said another way, the memory map may have been previously operating with an old or default interface, and upon detecting the new hardware interface, the memory map may be automatically updated in accordance with the new, customized interface. Subsequently, one or more programs, e.g., included in a task, may be executed on the PrC, each of which may use the now-available I/O included in the updated memory map. In other words, the programs may operate in conjunction with the PHE; i.e., the programs may write to the memory map from which the PHE reads, and the PHE may write to the memory map from which the programs read. In some embodiments, the one or more programs may include one or more graphical programs and/or text-based programs. In one embodiment, the one or more programs may be downloaded and executed on the PrC subsequent to the automatic detection and automatic updating of the memory map.

In some embodiments, the PrC and the PHE may execute a program, e.g., a graphical program, in a distributed fashion. For example, one portion of the program may specify the functionality of the PHE with regard to the I/O of the PrC and the devices coupled to the PHE, and the other portion of the program may specify the operation of the one or more programs executing on the PrC. In embodiments where the program includes a graphical program, the two portions may be portions of the block diagram of the program. In one embodiment, a third portion of the program, e.g., a graphical user interface (GUI), may execute on a host computer coupled to the PrC.

In some embodiments, the automatic detection and automatic updating of the memory may be invoked by input, which may be received from a computer system, a controller module, or a device coupled to the PrC, among others. In some embodiments, the input may be received from a user, e.g., via the computer system using a graphical user interface (GUI) or human-machine interface (HMI). Alternatively, the automatic detection and updating may be performed upon entering specified modes of the PrC, e.g., an initialization mode of the PrC, e.g., during or subsequent to powering on the PrC, or a detection mode, among others.

The method may also include halting the PrC in accordance with received input, automatically detecting a new I/O interface of the at least one PHE, and automatically updating the memory map according to the new I/O interface one or more times, i.e., iteratively. Similar to above, the input may be received from various users and/or sources.

BRIEF DESCRIPTION OF THE DRAWINGS

A better understanding of the present invention can be obtained when the following detailed description of the preferred embodiment is considered in conjunction with the following drawings, in which:

FIG. 4 is a flowchart diagram illustrating one embodiment of a method for automatically updating a memory map of a PLC, according to one embodiment.

Figure 1A:
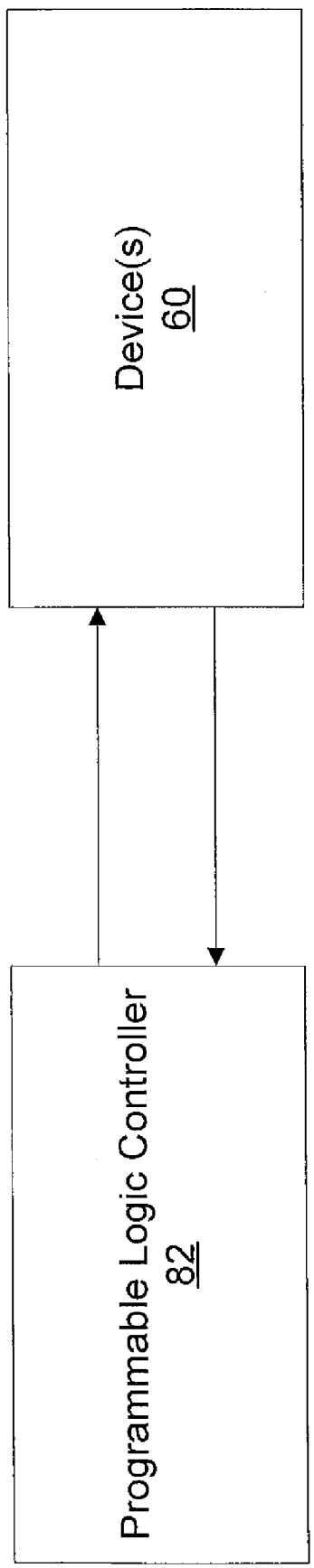
FIG. 1A illustrates a programmable logic controller coupled to one or more devices, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may include two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram includes interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may include only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may include a single window having one or more GUI Elements, or may include a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may include GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements include input controls and output indicators Input Control—a graphical user interface element for providing user input to a program. Exemplary input controls include dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Programmable Controller—programmable controllers may include programmable logic controllers (PLCs), programmable automation controllers (PACs), distributed control systems (DCSs), and/or other programmable controllers which utilize scanning architectures.

Task—A task may be included in a programmable controller and may itself include programs and variables, e.g., variables used by the programs. A task may define the schedule and/or manner in which the programs may be executed on the programmable controller, and may include a memory table that is updated before the execution of programs included in the task. For execution, the programs in the task may be assigned an execution order within the task, i.e., the order defines priority of program execution. Additionally, in a multitasking environment, each task may be assigned a specified priority with respect to the other tasks.

Programmable Controllers

The following descriptions describe embodiments of systems which utilize PLCs, PACs, and/or DCSs. Note that embodiments herein described with respect to PLCs may equally apply to embodiments with PACs and/or DCSs. In particular the embodiments may apply to those programmable controllers which implement scanning architectures, such as, for example, those described below. Note however, that the programmable controllers are not limited to those described herein, and that other programmable controllers are envisioned.

FIG. 1A—Programmable Logic Controller System

FIG. 1A illustrates a programmable logic controller (PLC) 82 suitable for implementing various embodiments of the present invention. The term "PLC" or "programmable logic controller" is intended to have the full breadth of its ordinary meaning, and at least includes the characteristics described herein.

The PLC 82, may include a processor as well as a memory medium(s) coupled to the processor on which one or more computer programs or software components may be stored. For example, the memory medium may store one or more programs which are executable to perform the methods described herein. In some embodiments, the programs may include graphical programs. Various embodiments further include receiving or storing instructions and/or data implemented in accordance with the foregoing description upon a carrier medium.

As shown in FIG. 1A, the PLC 82 may be coupled to one or more devices, e.g., device(s) 60. In some embodiments, the devices may be coupled directly to the PLC via an electrical interface. The devices may also be coupled to the PLC 82 via an intermediary device, e.g., another PLC 82, a programmable hardware element (PHE), or other suitable devices. In another embodiment, the devices may be implemented at a remote location and may be coupled to the PLC 82 via a network, e.g., LAN, WAN, Internet, Intranet, etc. In one embodiment, the PLC 82 may communicate directly with the one or more devices, or, alternatively, an intermediary device may provide a network communication interface between the PLC 82 and the remote devices. In various embodiments, the PLC 82 may communicate with the remote devices directly, or via an intermediary device, using any of a variety of communication protocols, e.g., TCP/IP, GPIB, Ethernet (e.g., CSMA/CD), Local Talk (e.g., CSMA/CA), Token Ring, FDDI, ATM, NetBEUI, IPX/SPX, IPv6, CANopen, DeviceNet, PROFInet, EtherNet/IP, EtherCT, Ethernet Powerlink, SERCOS, or other suitable communication protocols.

In some embodiments, the PLC 82 may be coupled to a PHE, e.g., a field-programmable gate array (FPGA), which may provide a hardware interface between the PLC 82 and one or more coupled devices, e.g., device(s) 60. As indicated above, the devices may be local or remote to the PLC 82 and/or PHE, and may communicate with the PLC 82 via the PHE using any of various protocols. The devices may be of various types and may perform any of various tasks as will be described in more detail below.

In some embodiments, the PLC 82 may be included in or coupled to a chassis. In various embodiments, the chassis may include one or more module expansion slots operable to receive expansion modules. The expansion slots may be operable to receive any of a variety of expansion modules, including, PCI, PCI Express, ISA, PXI, VXI, GPIB, or other suitable form factors and/or card types. The expansion modules may be coupled to and may communicate with the PLC 82 via a backplane. For example, the backplane may include the programmable hardware element, e.g., the FPGA, which may operate to provide input and output to the PLC 82 from one or more devices included in or coupled to the chassis, e.g., the expansion modules plugged into the expansion slots or other devices coupled to the chassis. Additionally, in various embodiments, the backplane may implement any of a variety of buses, including, but not limited to, a VXI (VME eXtensions for Instrumentation) bus, a GPIB (General Purpose Interface Bus) bus, a PXI (PCI eXtensions for Instrumentation) bus, a CAN bus, a Profibus bus, a serial bus, a parallel bus, or other suitable buses. In some embodiments, where the backplane includes or is a PHE, a user may be able to program the PHE such that the backplane performs operations on the input and output from the PLC 82 and/or the devices coupled to the chassis. Examples of operations or functions that the PHE may perform will be described in more detail below.

In some embodiments, the PLC 82 may be coupled to a plurality of different programmable hardware elements, e.g., FPGAs, each communicating with the PLC 82 locally and/or remotely. One or more of the PHEs may be coupled to the PLC 82 or chassis via a networked connection and may provide I/O from devices or expansion modules coupled to the one or more remote PHEs. Similar to above, the PHEs may implement one or more of the above listed, or other, suitable protocols for network communication.

In one embodiment, the PLC 82 may be coupled to one or more PHEs, which may provide a hardware interface between the PLC 82 and one or more devices, and one or more other devices. The one or more other devices may be coupled to the PLC 82 directly and/or via an intermediary device.

In another embodiment, the PLC 82 may be coupled to a PHE which may be coupled to one or more devices and one or more other PHEs. In this embodiment, the PHE may provide a hardware interface between the one or more devices and the one or more other PHEs (each of which may provide a hardware interface for at least another device), and the PLC 82.

Figure 1B:
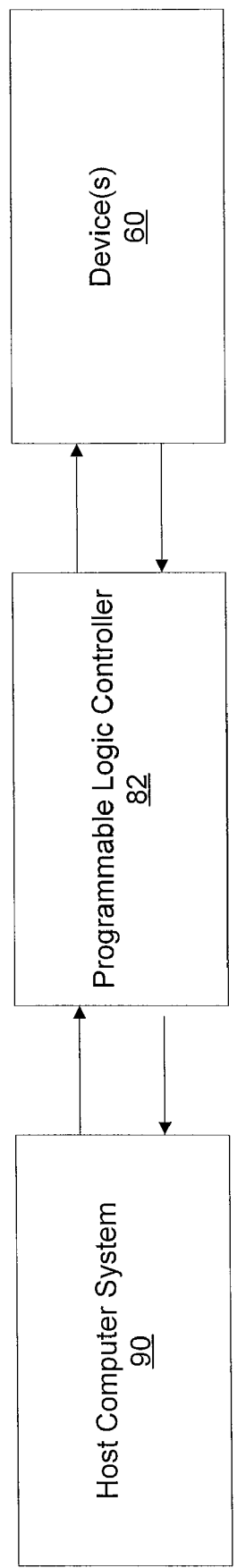
FIG. 1B illustrates a system comprising a programmable logic controller (PLC), one or more devices, and a host computer system that may implement one embodiment of the present invention.

FIG. 1B—Programmable Logic Controller Coupled to a Host Computer System

FIG. 1B illustrates a system including the programmable logic controller 82 coupled to the device(s) 60 as well as a host computer system 90. The PLC 82 may be coupled to the host computer system 90 via a network or a computer bus using any of various networks and protocols described above, among others. The computer system 90 may be any of various types, as desired. In some embodiments, a program executing on the computer system 90 may provide a human-machine interface (HMI) for the PLC 82. For example, the program may be an HMI application executing on the host computer, and facilitating user interaction with the PLC 82. In this embodiment, the program may receive input from a user on host computer system 90 with regard to instructions for the PLC 82, which may then provide input to the PLC 82 accordingly. In some embodiments, the instructions may also be directed toward, and subsequently provided to, the PHE providing the hardware interface between the device(s) and the PLC 82.

In one embodiment, a program, e.g., a graphical program, may be downloaded to and executed on the PLC 82, and/or one or more devices, e.g., one or more PHEs, coupled to the PLC 82. In some embodiments, the program may provide a runtime environment for tasks executing on the PLC 82. For example, an application development environment with which the program is associated (e.g., the LabVIEW graphical program development environment, provided by National Instruments Corporation) may provide support for downloading a program for execution on the PLC 82 in a real time system.

In some embodiments, the program, e.g., the graphical program, may execute in a distributed fashion. For example, at least one portion of the program, e.g., at least one portion of a block diagram of the program, may be implemented and/or executed on one or more PHEs coupled to the PLC 82 and another portion, e.g., another portion of the block diagram, may be implemented and/or executed on the PLC 82. In one embodiment, one portion, e.g., the program's GUI, of the program may be executed on the host computer system coupled to the PLC 82.

In further embodiments, the PLC 82 may be a "soft" PLC, i.e., a computer program running on a computer system such as host computer system 90 that mimics the operation of a standard PLC. The computer program may be a graphical program, such as a LabVIEW graphical program, and may operate to perform all the functionality of PLCs described herein.

Exemplary Systems

Embodiments of the present invention may apply to automatically updating memory maps in a PLC, described below in detail. The present invention may be applicable in systems involved with performing test and/or measurement functions; controlling and/or modeling instrumentation or industrial automation hardware; modeling and simulation functions, e.g., modeling or simulating a device or product being developed or tested; etc.

However, it is noted that the present invention may be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as network control, network monitoring, financial systems, games, etc.

Figure 2A:
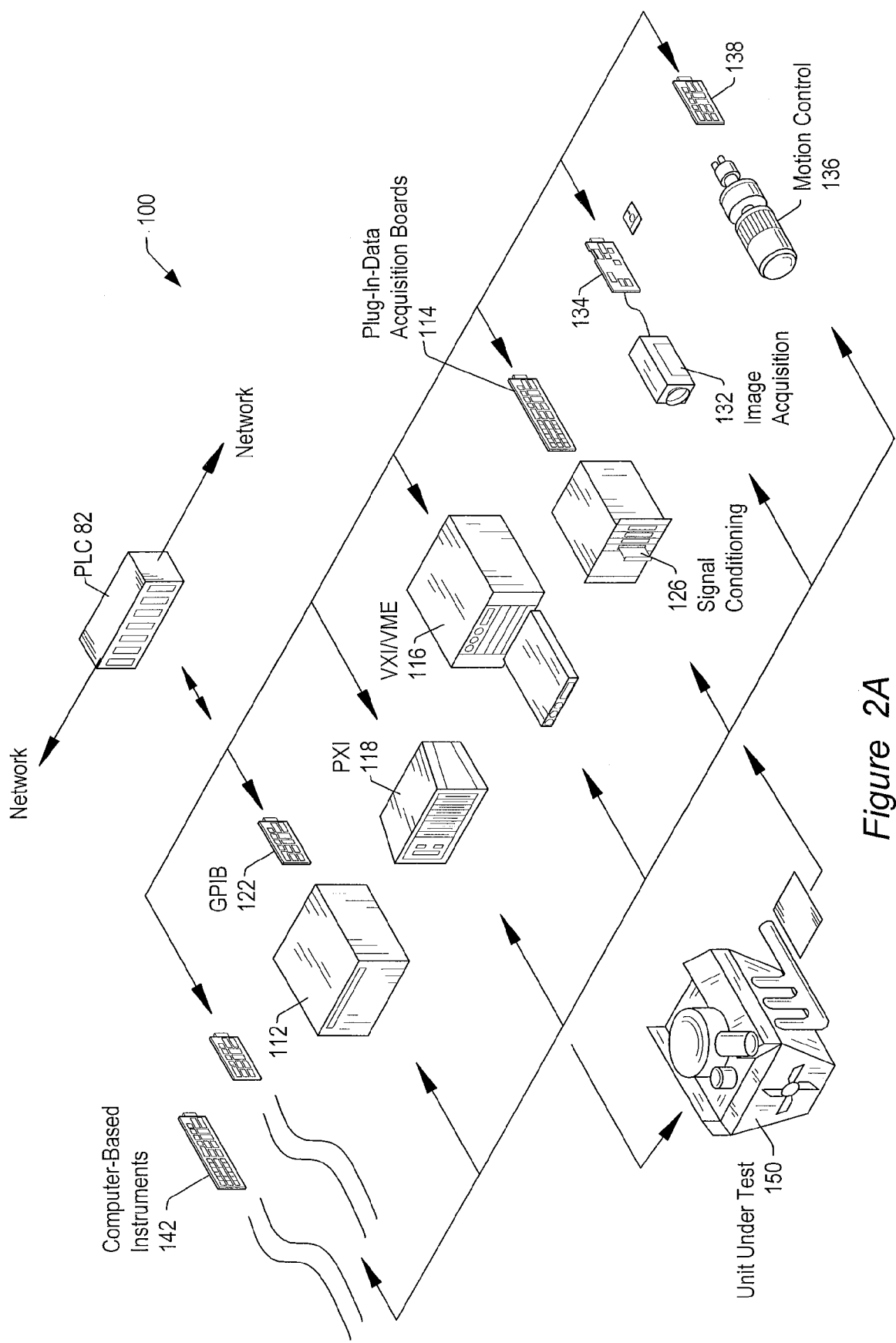
FIG. 2A illustrates an instrumentation control system, according to one embodiment.

FIG. 2A illustrates an exemplary instrumentation control system 100 which may implement embodiments of the invention. The system 100 includes programmable logic controller 82, which may couple to one or more instruments, e.g., via a PHE. As described above, the PLC 82 may include a processor and memory. The PLC 82 may operate with the one or more instruments to analyze, measure, or control the unit under test (UUT) or process 150.

The one or more instruments may include a GPIB instrument 112 and associated GPIB interface card 122, a data acquisition board 114 and associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The PLC may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
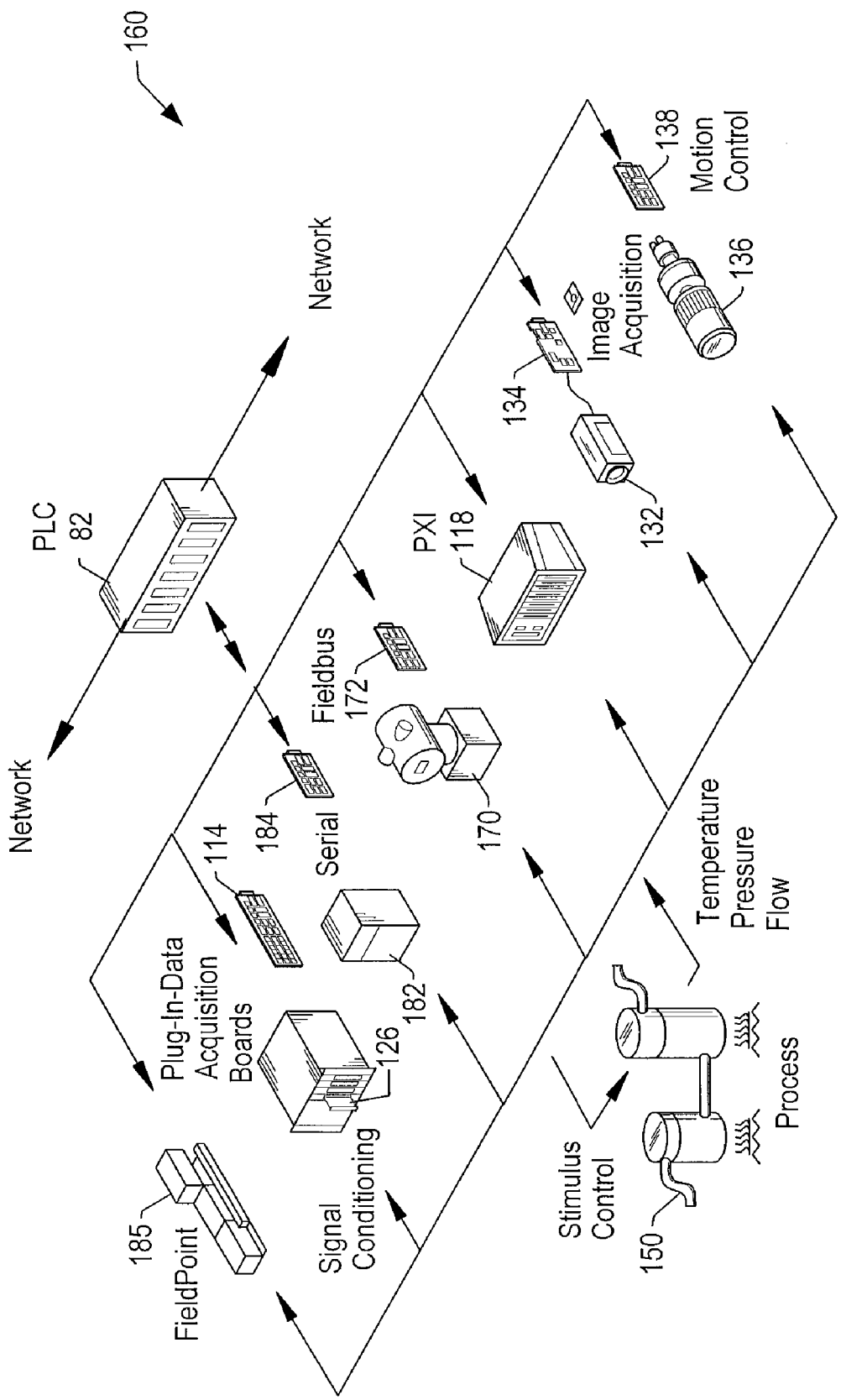
FIG. 2B illustrates an industrial automation system, according to one embodiment.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may include programmable logic controller 82 which couples to one or more devices or instruments. The PLC 82 may include a processor and memory. The PLC 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 126, a PXI instrument 118, a video device 132 and associated image acquisition card 134, a motion control device 136 and associated motion control interface card 138, a fieldbus device 170 and associated fieldbus interface card 172, a serial instrument 182 and associated serial interface card 184, or a distributed data acquisition system, such as the Fieldpoint system available from National Instruments, among other types of devices.

Figure 3:
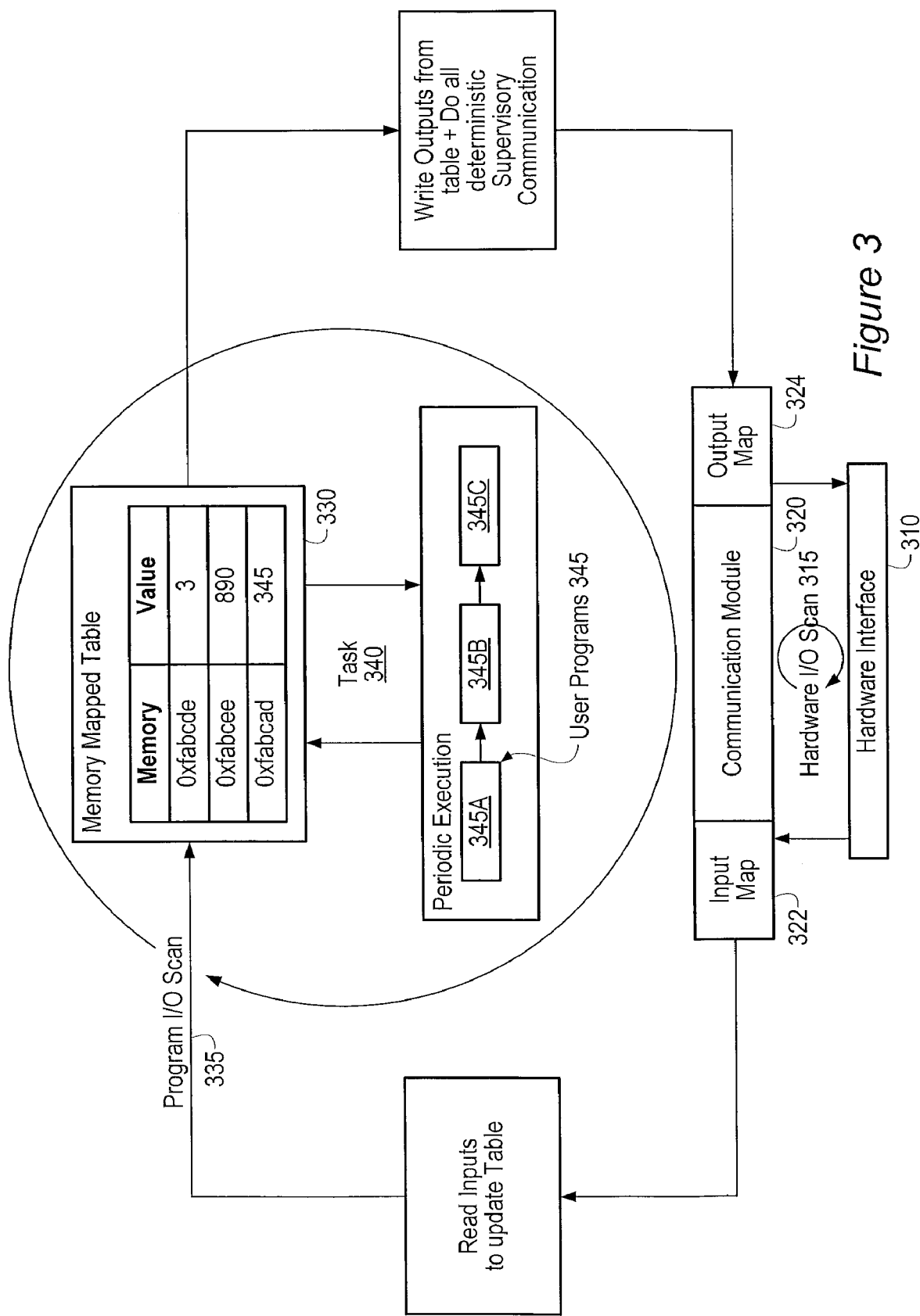
FIG. 3 is a block diagram illustrating the functionality of an exemplary programmable logic controller, according to one embodiment.

FIG. 3—Functionality of an Exemplary Programmable Logic Controller

FIG. 3 is a block diagram illustrating the functionality of an exemplary programmable logic controller according to some embodiments of the present invention. As shown in FIG. 3, various elements may provide respective functionality of the PLC. For instance, as noted above, hardware interface 310, e.g., a PHE, may provide for communication between the PLC and coupled devices. Additionally, communication module 320 may include a memory map, i.e., an input map 322 and an output map 324, for receiving and storing information from and to the coupled devices (via the hardware interface 310) respectively. Note that the memory map may be included in or coupled to the PLC. Additionally, the PLC may include one or more tasks, e.g., task 340, that may execute during PLC operation. Each task may include one or more user programs, e.g., 345A, 345B, and 345C, that may access a memory mapped table 330 for reading and writing data, e.g., for communicating with hardware coupled to or comprised in the PLC. It should be noted that one or more of the user programs may be graphical programs or text-based programs.

During execution, the PLC may utilize a hardware input/output (I/O) scan 315 of the hardware interface 310 to update the input map 322 according to hardware output, and to provide input to the hardware via the output map 324 of the communication module 320. A program I/O scan 335 may read inputs from the input map 322 and write these inputs into memory mapped table 330. The program I/O scan 335 may also write outputs from the memory mapped table 330 into the output map 324. Thus, the memory map, i.e., the I/O maps, and memory mapped table may facilitate communications between the tasks (i.e., programs included in the tasks) and hardware coupled to or comprised in the PLC.

One or more tasks may be executing on the PLC, such as task 340. Each task may have an associated frequency of execution, i.e., the number of times the task is executed within a specified amount of time, or the length of time between executions, e.g., a task may execute every 10 ms, 100 ms, 504 ms, etc.

Additionally, as noted above, each task may include one or more programs, such as user programs 345, e.g., programs 345A, 345B, and 345C. Each program, as shown, may have a specific respective priority, e.g., the programs may have a specific order of execution each time the task executes. For example, in each task execution cycle, program 345A may execute first, followed by programs 345B and 345C. In some embodiments, the task may execute according to one or more timed loops whose operation may be specified by a program, e.g., a graphical program or a text-based program, included in the PLC, e.g., a timed loop scheduler. In some embodiments, the PLC may include a runtime environment, e.g., LabVIEW runtime, which specifies task execution. The runtime environment may include a controller engine for tasks executing in the PLC, and, in embodiments where timed loops are implemented, the timed loop scheduler.

FIG. 4—Method for Automatically Updating a Memory Map of a PLC

FIG. 4 illustrates a method for automatically updating a memory map of a programmable logic controller, according to one embodiment. The method shown in FIG. 4 may be used in conjunction with any of the systems or devices described above. Note that the embodiments described below are directed towards a PLC coupled to one or more PHEs.

In various embodiments, some of the method elements shown may be performed concurrently, in a different order than shown, or may be omitted. Additional method elements may also be performed as desired. As shown, the method may operate as follows.

In 402, a programmable logic controller (PLC) may automatically detect at least one programmable hardware element (PHE) coupled to the PLC. The detection may be performed by a program or runtime environment running on the PLC, e.g., the controller engine. In some embodiments, the PHE may include at least one field-programmable gate array (FPGA). The PHE may provide a customizable interface between one or more devices coupled to the PHE and the PLC. As described above, the devices may be any of various types, such as, for example, measurement device(s), data acquisition device(s), signal generation device(s), automation device(s), motion control device(s), and/or analysis device(s), among others.

In some embodiments, the PHE may provide a customizable interface between the devices coupled to the PHE, and/or between the one or more devices and programs executing on the PLC, e.g., via the memory map of the PLC. As described above, the one or more devices may be coupled to the PHE in various ways, e.g., using various protocols for remote or local communication, via various networks and/or buses, such as those already listed above, as well as others. Similarly, the PHE may be coupled to the PLC remotely or locally and may communicate with the PLC via various protocols and buses. As described above, in some embodiments, the PLC may be included in a chassis which may include one or more slots, and the backplane of the chassis may include the PHE coupled to the PLC. In these embodiments, at least one of the one or more devices may include a module insertable into a slot of the chassis. Said another way, a subset or all of the devices may include modules which may be inserted into the chassis and may couple to the PLC via the backplane, in this case, the PHE.

In some embodiments, the PHE may perform one or more functions on the input and/or output of the devices and/or the PLC. For example, the PHE may be operable to receive data from a device coupled to the PHE and perform one or more functions on the data, e.g., a transformation function on a signal, and subsequently provide the modified data to the PLC. Similarly, the PHE may be operable to perform one or more functions on data received from the PLC and provide the modified data from the PLC to the one or more devices. Note that the I/O of the PLC and devices may include digital and analog I/O data points as well as higher-level I/O data, such as sensor and/or actuator data, e.g., set points, encoder positions, etc. As an example, consider a high-speed control loop, e.g., a proportional integral derivative (PID) control loop, implemented in a PHE controlling a motor with a built in interpolation algorithm. This control loop may execute every ten microseconds, and a slower control loop (periodic task implementing trajectory generation) may execute on the PLC and may update coefficients used by the interpolation algorithm each millisecond. Thus, the control loop generates ten set points internally for every set point updated by the slower loop executing on the PLC. In this example, the interface or I/O exported by the PHE may include higher-level I/O data such as, for example, the set of coefficients, the PID gains in addition to the current position, and the status of the motor. Note that the I/O may include any of various types of data transmitted between the PLC and the devices and is not limited to those listed above.

In some embodiments, the PHE may be customized by a program, e.g., a graphical program, which may specify the functions usable on the I/O of the PLC and the one or more coupled devices. Thus, the PHE may provide a customizable interface between the one or more devices and the PLC, e.g., one or more programs executing on the PLC, e.g., included in one or more tasks executing on the PLC.

As described above, in some embodiments, the PLC may be coupled to a plurality of PHEs. Similar to above, each of the PHEs may provide a customizable interface between the PLC and one or more devices coupled to each of the PHEs. As indicated above, at least a subset of the PHEs may be remotely or locally coupled to the PLC, e.g., via various buses and/or networks and via various protocols. Additionally, each of the PHEs may be customized via one or more programs, e.g., graphical program(s) and/or text-based program(s). In some embodiments, the PLC may communicate directly, and/or via one or more intermediate devices, with remote PHEs.

Figure 5:
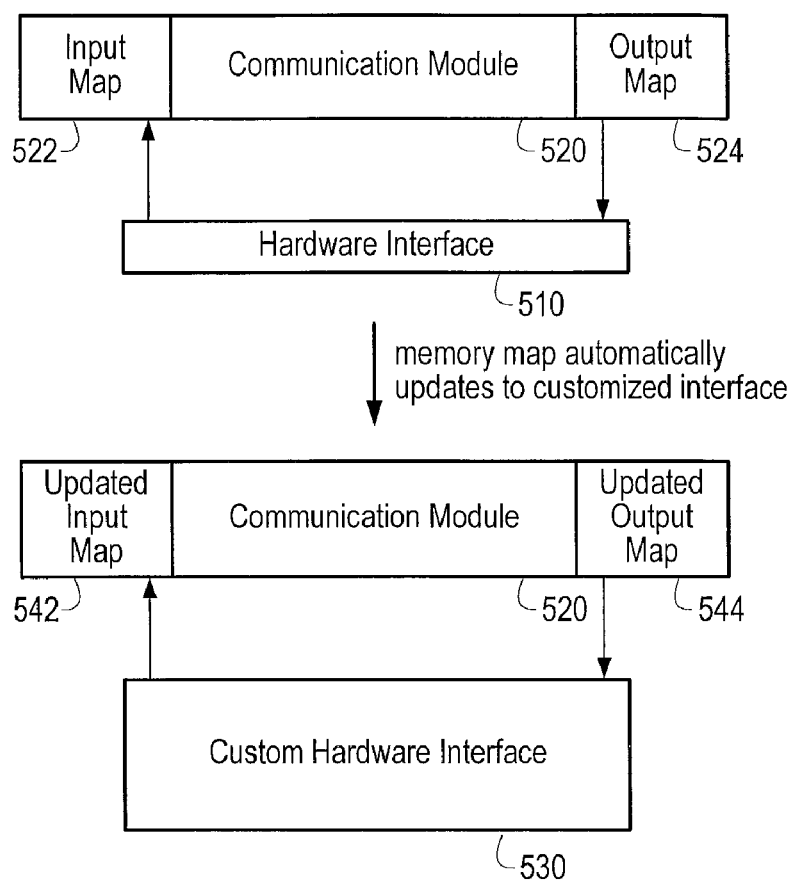
FIG. 5 illustrates an example of a PLC before and after customization of a hardware interface, according to one embodiment.

In 404, the PLC may automatically update a memory map based on a hardware I/O interface of the at least one programmable hardware element. In other words, the PLC, e.g., the controller engine executing on the PLC, may automatically detect the I/O of the at least one PHE coupled to the PLC and update, e.g., adapt, the memory map either included in or coupled to the PLC in accordance with the I/O of the PHE. Said another way, the memory map may have been previously operating with an old or default interface, e.g., hardware interface 510, illustrated in FIG. 5, and upon detecting the new hardware interface, e.g., custom hardware interface 530, the memory map, i.e., the input and output maps 522 and 524, may be automatically updated in accordance with the customized interface, e.g., updated input map 542 and updated output map 544. Subsequently, one or more programs, e.g., included in a task, may be executed on the PLC, each of which may use the now-available I/O included in the updated memory map, as described above regarding FIG. 3. In other words, the programs may operate in conjunction with the PHE; i.e., the programs may write to the memory map from which the PHE reads, and the PHE may write to the memory map from which the programs read. In some embodiments, the one or more programs may include one or more graphical programs and/or text-based programs. In one embodiment, the one or more programs may be downloaded and executed on the PLC subsequent to the automatic detection and automatic updating of the memory map.

In some embodiments, the PLC and the PHE may execute a program, e.g., a graphical program, in a distributed fashion. For example, one portion of the program may specify the functionality of the PHE with regard to the I/O of the PLC and the devices coupled to the PHE, and the other portion of the program may specify the operation of the one or more programs executing on the PLC. In embodiments where the program includes a graphical program, the two portions may be portions of the block diagram of the program. In one embodiment, a third portion of the program, e.g., the graphical user interface, may execute on a host computer coupled to the PLC.

In some embodiments, the automatic detection and automatic updating of the memory may be invoked by input, which may be received from a computer system, a controller module, or a device coupled to the PLC, among others. In some embodiments, the input may be received from a user, e.g., via the computer system using a graphical user interface (GUI) or HMI. Alternatively, the automatic detection and updating may be performed upon entering specified modes of the PLC, e.g., an initialization mode of the PLC, e.g., during or subsequent to powering on the PLC, or a detection mode, among others.

The method may also include halting the PLC in accordance with received input, automatically detecting a new I/O interface of the at least one PHE, and automatically updating the memory map according to the new I/O interface one or more times, i.e., iteratively. Similar to above, the input may be received from various users and/or sources.

Thus, various embodiments of the present invention may allow a PLC to automatically update a memory map, based on a hardware I/O interface of at least one PHE.

Further Embodiments

In some embodiments, the systems and methods described above may also be applied to various other types of programmable controllers, e.g., programmable automation controllers (PACs) and/or distributed control systems (DCSs). More specifically, they may be applied to any type of programmable controller that utilizes the scanning architecture described above, e.g., regarding FIG. 3. In other words, the programmable controller may retrieve and store information from and to the memory map a plurality of times in order to update information to and from the programmable hardware element. More specifically, the programmable controller may cyclically retrieve information from the memory map, e.g., received from the programmable hardware element, and provide that information to programs executing on the programmable controller. Within each cycle, the programmable controller may also retrieve information from the programs executing on the programmable controller and store that information to the memory map, e.g., to be retrieved by the programmable hardware element. Thus, the programmable controller may utilize a scanning architecture during execution. As indicated above, the programmable controller may include PACs and/or DCSs which utilize this scanning architecture.

The term "programmable automation controller" is intended to capture the full breadth of its ordinary meaning and at least includes the characteristics described herein. In general, PACs combine the features of normal PLCs, such as those described above, with the capabilities of computer system control systems, e.g., using a personal computer. In some cases, PACs may provide a more open, modular programming environment than provided by normal PLCs. Additionally, such PACs may provide the protection and stability provided by PLCs that personal computing systems generally lack. For example, the PACs may include a ruggedized housing for protection from the local environment which can sometimes be quite corrosive. Additionally, the PACs may be generally more stable than personal computing systems simply due to the nature of current standard personal computing operating systems. Thus, in some embodiments, at least one PAC, e.g., using the scanning architecture described herein, may be used in conjunction with the architectures, systems, and methods described above. In other words, the PAC may include a memory map which may be updated according to a coupled programmable hardware element, as described above. Additionally, the PAC may include one or programs which interact with the programmable hardware element and coupled devices to perform various functions, e.g., control functions, automation functions, etc. Said another way, the descriptions above that relate to PLCs may equally apply to PACs.

Additionally, the term "distributed control system" is also intended to capture the full breadth of its ordinary meaning and at least includes the characteristics described herein. In general, DCSs include one or more instruments or computing systems for implementing various processes, such as those described above in relation to the use of PLCs. Thus, similar to the above descriptions regarding PACs, one or more DCSs may be used in conjunction with the systems and methods described herein. In other words, the DCSs may be used to perform any of the processes described above which are described with regard to PLCs.

Thus, a memory map of a programmable controller may be automatically updated according to the I/O of a programmable hardware element. As described above, the programmable controller may be used to implement any of a variety of functions and/or processes.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method, comprising:
   a programmable controller automatically detecting at least one programmable hardware element (PHE) coupled to the programmable controller, wherein the at least one PHE comprises a programmable logic device (PLD);
   the programmable controller automatically updating a memory map based on a hardware I/O interface of the at least one PHE, wherein the memory map facilitates communications between programs executing on the programmable controller and the at least one PHE, and wherein the at least one PHE provides a customizable interface between one or more devices and the programs executing on the programmable controller; and
   the programmable controller retrieving and storing information from and to the memory map a plurality of times to update information to and from the at least one PHE, wherein said retrieving and storing comprises the programmable controller utilizing a scanning architecture.

2. The method of claim 1, wherein said retrieving and storing information from and to the memory map is performed cyclically and comprises:
   the programmable controller retrieving first information from the memory map and providing the first information to programs executing on the programmable controller; and
   the programmable controller retrieving second information from the programs executing on the programmable controller and providing the second information in the memory map.

3. The method of claim 1,
   wherein the programmable controller comprises a programmable logic controller.

4. The method of claim 1,
   wherein the programmable controller comprises a programmable automation controller.

5. The method of claim 1,
   wherein the programmable controller comprises a distributed controller system.

6. The method of claim 1, further comprising:
   executing at least one program on the programmable controller, wherein the at least one program operates in conjunction with the at least one PHE, and wherein the at least one program is comprised in a task executing on the programmable controller.

7. The method of claim 6,
   wherein the at least one program comprises one or more of:
       at least one graphical program, wherein the at least one graphical program comprises a plurality of interconnected nodes that visually indicate functionality of the graphical program; and
       at least one text-based program.

8. The method of claim 1, further comprising:
   receiving at least one program to the programmable controller from a host computer system coupled to the programmable controller; and
   executing the at least one program, wherein the at least one program operates in conjunction with the at least one PHE, and wherein the at least one program is comprised in a task executing on the programmable controller.

9. The method of claim 1, wherein the at least one PHE comprises at least one field-programmable gate array (FPGA).

10. The method of claim 1, wherein the programmable controller is comprised in a chassis, wherein the chassis comprises one or more slots, wherein at least one of the one or more devices comprises a module inserted into a slot of the chassis.

11. The method of claim 1, wherein the at least one PHE is comprised within the backplane of the chassis.

12. The method of claim 1, wherein the one or more devices comprise one or more of:
    a measurement device;
    a data acquisition device;
    a signal generation device;
    an automation device;
    a motion control device; and
    an analysis device.

13. The method of claim 1, further comprising:
    the at least one PHE receiving data from at least one device of the one or more devices coupled to the at least one PHE;
    the at least one PHE performing one or more functions on the data, thereby generating modified data; and
    the at least one PHE providing the modified data to the programmable controller.

14. The method of claim 1, further comprising:
    the at least one PHE receiving data from the programmable controller;
    the at least one PHE performing one or more functions on the data, thereby generating modified data; and
    the at least one PHE providing the modified data to at least one device of the one or more devices coupled to the at least one PHE.

15. The method of claim 1, wherein the at least one PHE is located remotely from the programmable controller.

16. The method of claim 1,
    wherein the at least one PHE comprises a plurality of PHEs coupled to the programmable controller, wherein at least one of the plurality of PHEs is located remotely from the programmable controller.

17. The method of claim 1, further comprising:
halting the programmable controller in response to received input;
automatically detecting a new hardware I/O interface of the at least one PHE; and
automatically updating the memory map according to the new hardware I/O interface of the at least one PHE;
wherein said halting, said automatically detecting the new hardware I/O interface, and said automatically updating the memory map according to the new hardware I/O interface is performed one or more times.

18. The method of claim 17,
wherein the received input comprises input received from one or more of:
   a computer system coupled to the programmable controller;
   a user via the computer system coupled to the programmable controller;
   a controller module coupled to the programmable controller;
   a device coupled to the programmable controller; and
   a user.

19. The method of claim 1,
wherein the programmable controller comprises a soft programmable controller executing on a host computer.

20. The method of claim 1,
wherein the programmable controller is specified by a first portion of a graphical program and the PHE is specified by a second portion of the graphical program, and wherein the graphical program comprises a plurality of interconnected nodes that visually indicate functionality of the graphical program.

21. The method of claim 1, further comprising:
receiving input invoking said automatic detection and said automatic updating.

22. The method of claim 1,
wherein said automatic detection and said automatic updating are performed during initialization of the programmable controller.

23. The method of claim 1, further comprising:
the programmable controller automatically detecting a new hardware interface of the at least one PHE; and
the programmable controller automatically updating the memory map based on the new hardware interface of the at least one PHE.

24. A programmable controller, comprising:
a processor;
a memory medium coupled to the processor, comprising program instructions executable by the processor to:
automatically detect at least one programmable hardware element (PHE) coupled to the programmable controller, wherein the at least one PHE provides a customizable interface between one or more devices and one or more programs executing on the programmable controller, and wherein the at least one PHE comprises a programmable logic device (PLD);
automatically update a memory map based on a hardware I/O interface of the at least one programmable hardware element, wherein the memory map facilitates communications between the one or more programs executing on the programmable controller and the at least one PHE; and
retrieve and store information from and to the memory map a plurality of times to update information to and from the at least one PHE, wherein said retrieving and storing comprises the programmable controller utilizing a scanning architecture.

25. A computer-accessible memory medium comprising program instructions, wherein the program instructions are executable by a processor to:
automatically detect at least one programmable hardware element (PHE) coupled to a programmable controller, wherein the at least one PHE provides a customizable interface between one or more devices and one or more programs executing on the programmable controller, wherein the at least one PHE comprises a programmable logic device (PLD);
automatically update a memory map based on a hardware I/O interface of the at least one programmable hardware element, wherein the memory map facilitates communications between the one or more programs executing on the programmable controller and the at least one PHE; and
retrieve and store information from and to the memory map a plurality of times to update information to and from the at least one PHE, wherein said retrieving and storing comprises the programmable controller utilizing a scanning architecture.

26. A system, comprising:
means for automatically detecting at least one programmable hardware element (PHE) coupled to a programmable controller, wherein the at least one PHE provides a customizable interface between one or more devices and one or more programs executing on the programmable controller wherein the at least one PHE comprises a programmable logic device (PLD);
means for automatically updating a memory map based on a hardware I/O interface of the at least one PHE, wherein the memory map facilitates communications between the one or more programs executing on the programmable controller and the at least one PHE; and
means for retrieving and storing information from and to the memory map a plurality of times to update information to and from the at least one PHE, wherein said retrieving and storing comprises the programmable controller utilizing a scanning architecture.

* * * * *